United States Patent
Voigt et al.

(10) Patent No.: US 9,512,011 B2
(45) Date of Patent: Dec. 6, 2016

(54) PROCESS AND PLANT FOR TREATING WATER

(71) Applicant: Clean TeQ Holdings Ltd., Notting Hill (AU)

(72) Inventors: Peter Voigt, Notting Hill (AU); Nikolai Zontov, Notting Hill (AU); John Carr, Notting Hill (AU)

(73) Assignee: Clean TeQ Holdings Ltd., Notting Hill, Victoria ( * ) Notice: Subject to any disclaimer, the term of this patent is extended or adjusted under 35 U.S.C. 154(b) by 183 days.

(21) Appl. No.: 14/289,909

(22) Filed: May 29, 2014

(65) Prior Publication Data
US 2014/0263072 A1    Sep. 18, 2014

Related U.S. Application Data

(63) Continuation of application No. PCT/AU2012/001457, filed on Nov. 29, 2012.

(30) Foreign Application Priority Data

Nov. 29, 2011    (AU) .............................. 2011904963

(51) Int. Cl.
*C02F 9/00*    (2006.01)
*C02F 1/52*    (2006.01)
(Continued)

(52) U.S. Cl.
CPC .............. *C02F 1/004* (2013.01); *B01J 39/043* (2013.01); *B01J 39/046* (2013.01); *B01J 41/043* (2013.01);
(Continued)

(58) Field of Classification Search
CPC .......... C02F 1/42; C02F 1/5245; C02F 9/00; C02F 1/28; C02F 1/52; C02F 1/004; C02F 2303/16; C02F 1/56; B01J 39/043; B01J 49/003; B01J 49/0082; B01J 39/046; B01J 41/043; B01J 41/046; B01J 43/00; B01J 45/00; B01J 47/007; B01J 49/0008; B01J 49/0013; B01J 49/0069; B01J 49/0073
USPC ................................ 210/666, 667, 669, 676
See application file for complete search history.

(56) References Cited

U.S. PATENT DOCUMENTS 3,595,784 A *    7/1971    Butterworth ............. B01J 47/10
                                                           210/189
4,013,553 A *    3/1977    Karlson ................... B01J 47/12
                                                           210/665

(Continued)

OTHER PUBLICATIONS

International Search Report for International Application No. PCT/AU2012/001457, mailed Feb. 5, 2013.

(Continued)

*Primary Examiner* — Matthew O Savage
(74) *Attorney, Agent, or Firm* — Fish & Richardson P.C.

(57) ABSTRACT

A process for removing suspended particles and at least one ionic species from a feed water stream to produce a product water stream, the process includes the steps of forming agglomerates of the suspended particles in the feed water stream; passing the feed water stream containing agglomerated particles through a bed of particulate sorbent material so as to sorb the ionic species from the feed water onto the sorbent to provide a loaded sorbent and filter the agglomerated particles from the feed water using the bed of particulate sorbent material as a filtration medium to load the bed with the agglomerated particles, and thereby produce the product water stream; removing the filtered particles and the ionic species from the filtration medium; and re-using the regenerated sorbent in step b).

26 Claims, 2 Drawing Sheets

(51) Int. Cl.
*C02F 1/00* (2006.01)
*C02F 1/28* (2006.01)
*C02F 1/42* (2006.01)
*B01J 39/04* (2006.01)
*B01J 41/04* (2006.01)
*B01J 43/00* (2006.01)
*B01J 45/00* (2006.01)
*B01J 47/00* (2006.01)
*B01J 49/00* (2006.01)
*C02F 1/56* (2006.01)

(52) U.S. Cl.
CPC ............... *B01J 41/046* (2013.01); *B01J 43/00* (2013.01); *B01J 45/00* (2013.01); *B01J 47/007* (2013.01); *B01J 49/0008* (2013.01); *B01J 49/0013* (2013.01); *B01J 49/0069* (2013.01); *B01J 49/0073* (2013.01); *B01J 49/0082* (2013.01); *C02F 1/28* (2013.01); *C02F 1/42* (2013.01); *C02F 1/52* (2013.01); *C02F 1/5245* (2013.01); *C02F 9/00* (2013.01); *C02F 1/56* (2013.01); *C02F 2303/16* (2013.01)

(56) References Cited

U.S. PATENT DOCUMENTS

| | | | | |
|---|---|---|---|---|
| 4,430,228 | A | * | 2/1984 | Paterson ............... C02F 1/5281 210/665 |
| 5,064,531 | A | | 11/1991 | Wang et al. |
| 5,064,534 | A | | 11/1991 | Busch et al. |
| 5,374,357 | A | * | 12/1994 | Comstock ........... B01D 24/105 210/504 |
| 2010/0219131 | A1 | | 9/2010 | Levy |

OTHER PUBLICATIONS

International Preliminary Report on Patentability for International Application No. PCT/AU2012/001457, mailed Mar. 14, 2014.

* cited by examiner

LEGEND:
1. Column
2. Inlet water tank
3. Pump
4. Inlet valve
5. Resin transportation valve
6. Filter (screen)
7. Outlet valve
8. Outlet water tank

PROCESS AND PLANT FOR TREATING WATER

FIELD OF THE PRESENT INVENTION

The present invention relates to a process and plant for removing suspended particles and at least one ionic species from a feed water to produce a water product. The present invention can be used, but by no means exclusively, to produce a water product that is suitable for further treatment via, for example, membrane technology processes including reverse osmosis.

BACKGROUND OF THE PRESENT INVENTION

The growing shortage of fresh surface water has meant there is an increasing demand to use, where possible ground water, sea water, recycled water, and so forth instead of fresh surface water. The purification of non-fresh water can be achieved using a number of different technologies. In some cases, the feed water may be initially pretreated using coagulation and flocculation techniques, followed by secondary treatment such as sedimentation, clarification or sand filtration. A third treatment step may include membrane filtration such as reverse osmosis to achieve the desired water purification.

There is a need to provide alternative, efficient and cost effective technologies for purifying water on an industrial and or commercial scale. An example attracting interest involves treating recycled water or industrial waste water so that it can be used as a water source in applications that do not necessarily require drinking water.

SUMMARY OF THE PRESENT INVENTION

The present invention relates to a process for removing suspended particles and at least one ionic species from a feed water stream to produce a product water stream, the process includes the steps of:
 a) forming agglomerates of the suspended particles in the feed water stream;
 b) passing the feed water stream containing agglomerated particles through a bed of particulate sorbent material so as to
  i) sorb the ionic species from the feed water onto the sorbent to provide a loaded sorbent and
  ii) filter the agglomerated particles from the feed water using the bed of particulate sorbent material as a filtration medium to load the bed with the agglomerated particles, and thereby produce the product water stream;
 c) removing the filtered particles and the ionic species from the filtration medium; and
 d) re-using the regenerated sorbent in step b).

It will be appreciated that the above steps may be carried out simultaneously, for example, any two steps including steps b) or c) may be carried out simultaneously in a single column or different parts of a single column in communication. It is also possible that the above steps may be carried out consecutively or disjunctively in the same column or in different columns.

Throughout this specification the terms columns, vessels or pipes have been used interchangeably and embrace any form of chamber for holding material including liquid, gas or particulate material.

The step of removing the filtered particles and the ionic species from the filtration medium may include separating the filtered particles from the filtration medium and desorbing the ionic species from the sorbent using a desorbent to provide a regenerated sorbent material. Separating the filtered particles from the filtration medium and desorbing the ionic species may be carried simultaneously or disjunctively, for example, in different stages. Suitably, the filtered particles are separated from the sorbent prior to the ionic species is desorbed from the sorbent. In other words, the ionic species is desorbed after the filtered particles have been separated, for example, washed from the sorbent.

DETAILED DESCRIPTION

Forming Agglomerates

The step of forming agglomerates of the suspended particles may include any chemical reaction or physical reaction in which suspended particles are attracted together to form larger particles. The step of forming agglomerates may include agglomerating particles of any size less than 0.2 mm in cross section or diameter. Ideally, the agglomerates may be formed by combining particles having a size in the range of 10 nm to 0.1 mm. Particles in this size range include, but are by no means limited to colloids, and biological material such as viruses, bacteria, algae, protozoa and so forth. The purpose of forming agglomerates is to reduce the portion of the colloidal sized particles in the feed water stream.

Ideally the step of forming agglomerates includes treating a feed substream of the feed water with a coagulating agent. The coagulating agent may be any additive capable of changing the charge of the suspended particles. For example, increasing or reducing the amount of negative or positive charge of the suspended particles. Ideally the coagulating agent includes cations, which react with the suspended particles. The coagulating agent thereby reduces the net negative charge at the surface of the particles suspended in solution.

The type of coagulating agent used for treating the feed water may be based on the type of suspended particles, such as colloidal particles in the feed water. The coagulating agent may be an inorganic or organic coagulating agent.

Suitable inorganic coagulating agents include alum, ferric chloride, ferric sulphate, aluminium chloride, or a combination thereof. Treating the feed water may include, for example, adding ferric chloride in an amount from 5 to 20 mg/L, and ideally from 8 to 10 mg/L to the feed water.

Examples of organic coagulants include cationic quaternary ammonium monomer.

The coagulating agent may at least partially agglomerate the suspended particles in the feed water.

The step of forming agglomerates may include treating the feed water with a flocculating agent. The step of forming agglomerates may also include treating the feed water with either one, or a combination of, the coagulating agent and flocculating agent. In the situation in which both the coagulating agent and flocculating agent are used to treat the feed water, suitably, the coagulating agent is added to the feed water in a first stage so as to at least partially form agglomerates, and thereafter the flocculating agent is added to the feed water in a second stage to complete the formation of agglomerates in the feed water. The feed water may be stirred at a desired speed and for a required period during the first and second stages. Moreover, the final content of the feed water and concentration of the agglomerated suspended particles will depend on various factors of the feed water.

The flocculating agent may be a polymeric material, typically a polyelectrolyte, which can form "bridges" between individual particles. Bridging occurs when segments of a polymer chain adsorb onto different particles which helps the particles aggregate. Flocculating agents carry active groups with a charge which will counter balance the charge of the particles. Flocculating agents adsorb onto particles and cause destabilization either by bridging or charge neutralization. Examples of some suitable flocculating agents include the following.

a) Mineral flocculating agents which are colloidal substances and include:
   activated silica,
   certain colloidal clays (such as bentonite), and
   certain metallic hydroxides with a polymeric structure (alum, ferric hydroxide)
b) Natural flocculating agents which are water soluble anionic, cationic or non-ionic polymers. Non-ionic polymers adsorb on the suspended particles. Examples of natural flocculants include the following.
   Starch derivatives which may be pre-gelatinized, hence water-soluble, and may be corn or potato-starches. The can be natural starches, anionic oxidized starches or amine treated cationic starches. Starch derivatives are particularly suited to water treatment in paper manufacturing applications.
   Polysaccharides which may be guar gums and are mostly used in acid medium.
   Alginates which may be anionic. Synthetic flocculating agents which include polymers based on polyacrylamide, which is a non-ionic polymer. For each suspension, a certain degree of anionic, cationic or non-ionic character is beneficial. Examples of other synthetic flocculating agents include the following.
   Polyethylene-imines
   Polyamides-amines
   Polyamines
   Polyethylene-oxide
   Sulfonated compounds Sorbent and Ionic Species The particulate sorbent material may be any material including ion exchange resins that are typically selected based on their functionality, particle size distribution and hydro-mechanical strength. Suitably, the sorbent is granular and has a size distribution of less than 4.0 mm, and suitably ranging from 0.1 mm to 4.0 mm, and typically from 0.5 mm to 2.0 mm. We have found that this size range provides good filtering characteristics. The resins may be poly-disperse within these ranges. However, resins with particle sizes distributions outside of this range and mono-disperse resins could also be used.

The functionality of the sorbent is typically based on the target specie or species to be sorbed (including adsorbed) and may include the following: strong acid cation resin, weak acid cation resin, strong base anion resin, weak base anion resin, chelating or amphoteric exchanging resin.

Ideally, the resin will have a hydromechanical strength of greater than 95% when measured by the ball-mill attrition test. This strength will ensure that the resin can withstand handling while being moved between columns.

Examples of suitable sorbents may include ion exchange resins commercially available under the following trade names: Purolite C-150, Purolite C-105, Purolite A500-P, Dowex MWC-1, Lewatit CNP-80WS.

The ionic species that the sorbent can sorb or adsorb from the water may be any anion or cation species. Suitably, the ionic species sorbed includes divalent and trivalent cation containing species. Examples of divalent cation containing species include one or more of calcium, barium, strontium, and iron-containing species.

The sorbent may also sorb (such as adsorb) monovalent cation containing species.

The sorbent may also sorb (such as adsorb) ionic organic species including tannic, humic and fulvic species.

The filting properties of the resin will be deteremined the size destribution of the solid sorbent, which is suitably equal to or greater than 4.0 mm. In addition the shape of the sorbent will also play a role in the size of the voids between the sorbent in which the agglomerated particles are arrested from the feed water. In other words, the sorbent suitably functions as a particulate filtration medium.

While it is possible that the bed of the sorbent may be a fixed bed, it is preferred that the bed be a moving bed. The bed may be a continuously moving bed, or suitably a bed that moves in periodically (i.e., in stagewise) and stationary between the stagewise movement. In other words, the bed of sorbent particulate material may move intermittently.

In one example, the sorbent and feed water stream may flow in counter current directions in which the product water stream moves upwardly through a column and the bed of sorbent moves downwardly in a column. Ideally, barren sorbent is added to an upper section of the column, and ideally at the top of the column, and the product water stream is discharged at or near to the upper section or top of the column.

The entire bed or a section of the bed, typically a lower section of the bed may be withdrawn from the column.

Ideally, a lower section of the bed loaded with ionic species and loaded with filtered particles is discharged from a bottom section of the column on a periodic basis. While the lower section of the bed of sorbent is being removed from the column, the feed water stream may be stopped from entering the column, or alternatively, the feed water stream may be fed to part of the bed above the low section of the bed being discharged.

When the section of bed is not being discharged from the column, the feed water stream may be fed to the bottom section of the column.

The sorbent may be resident in the column for up to 10 hours, and suitably from 2 to 10 hours.

The water product stream discharged from the top of the column may have the following properties:
   Turbidity <0.5 NTU
   Silt Density Index <4

The amount of ionic species removed from the feed water stream may also be in the range of up to 99%, and suitably in the range of 95 to 99% removal.

The product water stream may then be consumed in its intended use, or alternatively, further treated using finer particulate and deionising technologies including electrofiltration and thin film technology including, for example, reverse osmosis.

Separating the Filtered Particles

Separating the filtered particles from the filtration medium may involve any form of separation technique including backwashing, trammel washing, cyclone separation, and continuous on-line filtration and washing. Continuous on-line filtration and washing may be a process where the sorbent filtration medium is provided in an upper section of a vessel for filtering the particulate material in a feed water and the filtration medium moves downwardly in the vessel and the feed water stream moves upwardly from the lower section to an upper section of the vessel. An airlift moves portions of the sorbent filtration medium from the lower section upwardly to a chamber that receives a portion of the filtered feed water so as to wash the filtered particles from sorbent filtration medium.

Suitably, the filtered particles are separated from the sorbent particles of the filtration medium by a washing water. The sorbent discharged from the column may be moved, for example by air lifting to a washing stage in which the filtered particles are washed from the sorbent. Washing the filtered particles may be carried out using any washing water, including mains water, river water, dam water, rain run off water and so forth. In one example, the washing water may be a substream of the feed water stream that has been split from the feed water stream prior to the step of forming agglomerates in the feed water stream.

The washing stage may be in the form of the column in which the sorbent enters the top of the column and moves intermittently down the column. Washing water may enter the bottom of the column, counter currently to the flow of the sorbent. The sorbent in the column is fluidised in at least one fluidised section of the column to enhance washing off of particles from the sorbent.

The sorbent may be fluidised in the fluidised section so as to allow the bed of the sorbent to expand in the range from 100 to 200% of the volume of the sorbent when in a solid non-fluidised bed. In the fluidised section, the washing water may flow at velocity of at least 10 m/hr and, suitably from 10 to 30 m/hr and ideally from 15 to 20 m/hr. The velocity may differ depending on the specific gravity, size and hydrodynamics of the sorbent particles.

The velocity of the washing water may be adjusted so that the velocity of the washing water allows the filtered particles to be fluidised and disengaged from the expanded resin. This effect can be achieved by selecting an appropriate cross-sectional area of the washing stage and/or managing the superficial velocity of the wash water flow. Particles flow with the water and are removed in the overflow. Resin is allowed to settle after the appropriate period of washing and prior to any resin transfer from that column.

The washing water may be injected into the column at varying points and/or a multiple streams of the washing water may be injected at different flow rates such that the washing water has a higher flow rate toward the top of the column and a lower flow rate toward the bottom of the column.

The overflow washing water containing the particles from this washing stage may be returned wholly or in part to either one or a combination of: the feed water pond; a sedimentation pond; a clarifier; an evaporation pond and so forth. Overflow from the clarifier or sedimentation pond may be returned back to the feed water stream.

Intermittently, a batch of washed sorbent may be transferred, for example, via an airlifting to a desorption stage.

Desorption

Desorbing the ionic species from the sorbent may be carried out using any desorption solution. For example, the desorption solution may be any one of: i) an acid such as an inorganic acid; ii) an alkaline such as an inorganic alkaline; and iii) a salt such as an inorganic salt.

Desorbing the ionic species may involve moving the sorbent in counter-current with the desorption solution in a desorption column.

By moving the sorbent in counter-current to the flow of the desorption solution, the driving force for reaction is maximised, thereby giving a more efficient desorption compared to batch operating philosophies. Fully loaded resin enters the top of the column, where the solution with the highest concentration of target species is discharged.

Fresh desorption solution enters the bottom of the desorption column counter currently to the flow of the loaded resin. As the desorption solution flows up the column, target species are stripped off the resin. Concentrated brine is discharged from the top of the column.

For example, the top of the column may have a candle stick drain (with a 400 μm screen) and concentrated brine flows to a brine tank.

Depending on the design of the desorption column, a ratio of the volume of the desorption solution to the volume of the bed of resin is from 1 to 2. For example, if the resin flow rate in the system is 1 m$^3$/hr, then 1-2 m$^3$/hr of desorption solution may be required.

The total resin residence time for the sorbent and the desorption solution in the desorption column may be up to 10 hours and typically from 5 to 10 hours.

Intermittently, a batch of regenerated sorbent may be discharged from the desorption stage and transferred, for example via an airlift, to a sorbent rinsing stage.

Sorbent Rinsing

The process may also include a sorbent rinsing step in which desorbed ionic species and desorption solution is washed or rinsed from the sorbent. Once rinsed, the sorbent may then be recycled for reuse in step b) in which the sorbent is used to sorb or adsorption ionic species and as a filter medium to filter particles, including agglomerated particles, from the treated feed water stream.

The rinsing step may be carried out using a rinsing water such as mains water, tank water, ground water and so forth. Suitably, the rinsing water is a substream of the water product stream.

Suitably, the rinsing step is carried out in a rinsing stage such as a rinsing column, in which water enters the bottom of the column and travels up the column in a direction counter-currently to the direction of movement of the sorbent.

A raw water stream, which contains a small concentration of desorption solution is discharged from the top of the rising column. For example, the raw stream may be discharged via a candle stick drain (with a 400 μm screen) and flows by gravity to the desorption solution tank. This water is mixed with concentrated desorption reagent, for example, an acid, alkaline or salt, to produce the desorption solution for use in the desorbing step.

Intermittently a batch of washed desorbent is transferred from the bottom of the desorption column via airlift to step b).

In addition to the information described above, the sorbent flow between the various steps may be semi-continuous, that is a quantity of sorbent moves from one step to the next in timed intervals, suitably regular time intervals.

In addition, transfer of the sorbent from one stage to the next occurs consecutively or disjunctively. Transfer of the sorbent from one stage to the next does not occur simultaneously. During the transfer of sorbent from any one of the columns, the solution being feed to the column is stopped while the sorbent is withdrawn from the respective column.

Transferring the sorbent from one column to the next may take any period, but typically in the range of 1-3 minutes.

According to the present invention there is also provide a plant for removing suspended particles and at least one ionic species from a feed water stream to produce a product water stream. The plant includes:

a mixing vessel or mixing pipe that receives a feed water stream and in which suspended particles of the feed water stream are agglomerated;

a first separation stage containing a bed of particulate sorbent material and through which the feed water stream containing agglomerated particles is conveyed so as to
  i) sorb the ionic species from the feed water onto the sorbent to load the sorbent and
  ii) filter the agglomerated particles from the feed water using the bed of particulate sorbent material as a filtration medium and thereby produce the product water stream;
a second separation stage in which the filtered particles and the ionic species are removed from the sorbent of the filtration medium; and
a conveying device for conveying the regenerated sorbent from the second separating stage to the first seperating stage.

The second separation stage may include a washing column into which is fed i) the bed of sorbent, and ii) a washing water for washing the filtered particles from the loaded bed.

The second separation stage may also include a desorbing column into which a desorbent strips the ionic species from the sorbent to form a regenerated sorbent. Suitably, the ionic species is stripped from the sorbent after the filtered particles have been removed, for example washed, from the sorbent.

The plant may also include any one of the features of the process described herein.

BRIEF DESCRIPTION OF THE DRAWINGS

The present invention will now be described further with reference to the accompanying drawings, of which.

DESCRIPTION OF THE DRAWINGS

Figure 1:
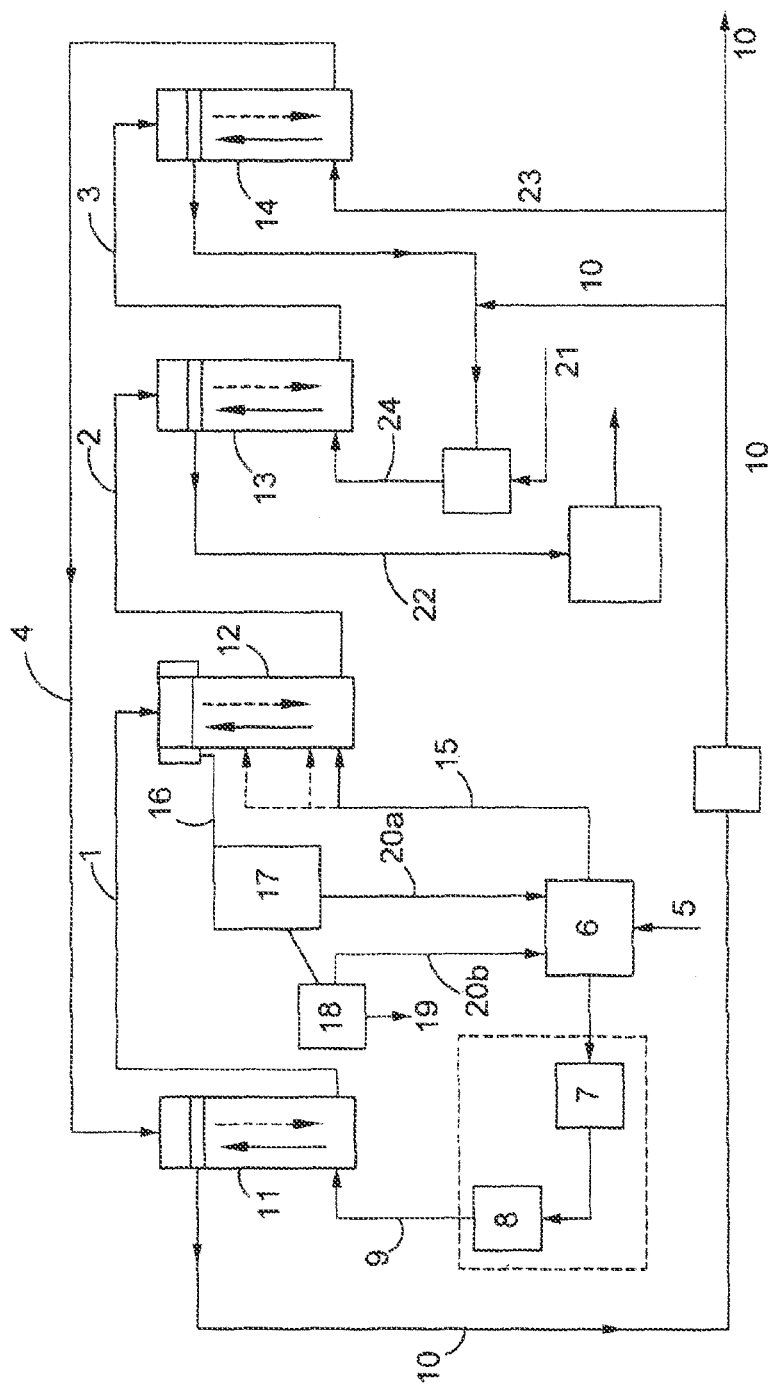
FIG. 1 is a diagram illustrating the process and plant according to a preferred embodiment of the present invention.

With reference to FIG. 1, the process and plant according to a preferred embodiment of the present invention includes four columns, namely adsorption column 11, washing column 12, desorption column 13 and rinsing column 14. A sorbent in the form of an ion exchange resin having a hydromechanical strength of greater than 95% when measured by a ball-mill attrition test, and a size distribution of equal to or less than 4.0 mm is conveyed down each column, as shown by the dashed arrows, and is conveyed from the bottom of one column to the top of the next column to the right via lines 1 to 3. Regenerated resin is recycled from the rinsing column 14 back to the adsorption column 11 via line 4.

A feed water stream 5 containing dissolved ion species and suspended particles having a size of at least 10 nm and suitably in the range of 10 nm to 0.1 mm is fed into a feed water tank 6. A product water stream 10 is produced from the feed water stream by forming agglomerates of the suspended particles. Ideally, forming the agglomerates is carried out in two stages, however, it will be appreciated that any number of stages may be used. The two stages suitably comprise an initial coagulating stage in which a coagulating agent such as ferric chloride is added to the feed water stream in mixing vessel 7 or mixing pipe at a concentration of approximately 8 to 10 mg/L of the feed water stream 5. The coagulation step will have the effect of neutralising the surface of a number of the particles, allowing the particles to at least partially agglomerate. The stage of forming agglomerates also suitably comprises adding a flocculating agent to the coagulated feed stream in vessel 8 to produce a pretreated feed stream 9 having formed agglomerates. Stream 9 is fed into the bottom of the desorption column 11 and conveyed upwardly, as shown by the direction of the solid arrow, which is in counter current to the direction of flow of the resin. As stream 9 flows upwardly in column 11, ionic species are sorbed onto the resin. In addition, the size distribution of the resin, namely equal to or greater than 4.0 mm is selected such that the agglomerated particles are captured in voids between the resin particles in the column 11 so that the feed stream 9 is filtered of the suspended particles and agglomerates.

A water product stream 10, relatively lean in sorbed ionic species and depleted of suspended particles in the size range of 10 nm to 0.1 mm is discharged from the top of column 11 as a result of the forming agglomerates step and the combined adsorbing and filtering characteristics of the sorbent resin. It will be appreciated that particles greater than 0.1 mm will also be filtered by the sorbent resin if present in the feed water. One of the benefits of the process and plant of the preferred embodiment is that extraneous steps, such as sand filtration, can be avoided prior to adsorption of the ionic material from the feed stream. According to the preferred embodiment, the water product stream 10 suitably has a turbidity of less than 0.5 NTU and a silt density index of less than 4.

Resin in column 11 is conveyed semi-continuously or stage-wise to the top of column 12 by a conventional airlift as shown by line 1. Specifically, a quality of resin is moved from column 11 to column 12 intermittently in regular time intervals, based on the conditions of the feed water stream 9. While the resin is being withdrawn from the bottom of column 11, supply of the feed water stream 9 to the bottom of column 11 is stopped. The resin in column 11 is in essence a solid and non-fluidised bed that moves in increments and is stationary for periods in which the resin is not removed from column 11.

Resin is fed to the top of washing column 12 and moves downwardly therein in the direction of the dashed arrow. Typically, a side stream 15 of the feed water stream 5 is split from tank 6 and fed to the bottom of the washing column 12 for use as washing water. The side stream 15 is split from feed water stream 5 prior to the forming agglomerates. The resin is sufficiently expanded or fluidised in the washing column 12, for example, the resin is fluidised by being suspended in 100 to 200% of the volume of washing water in which the resin is not fluidised, to efficiently wash the agglomerated particles off the resin. An overflow wash water stream 16 containing a large portion of the suspended particles may then be further treated in a clarifier 17 where solids and liquids are separated and the liquid being returned to the feed via tank 6 and solids being directed to a sedimentation or evaporation pond 18. Alternatively, the overflow may be directed to the feed pond 18.

Resin washed in the washing column 12 is discharged from the bottom of the column 12 and transferred by an airlift to the top of the desorption column 13 via line 2. Resin in column 13 moves downwardly in the direction of the dashed arrow and in counter-current to the direction of movement of a desorption solution stream 24, represented by the solid arrow. The desorption stream 24 comprises the wash water 14 to which a suitably agent 21 such as an acid, alkaline or salt has been added. The desorption stream 24 flows upwardly in the column 13 during which the ionic species on the resin is desorbed in preference to acid, alkaline or salt from the desorption solution and a brine solution 22 is discharged from the top of the column 13.

Resin stripped of the sorbed ionic species is then discharged from the bottom of column 13 and conveyed to the top of rinsing column 14 in line 3 by an airlift. The resin in column 14 moves downwardly in counter current to rinsing water stream 23, suitably a side stream of the product water stream 10. An overflow of the rinsing water stream 23 can be combined with the desorption agent 21 to form desorption stream 24.

Rinsed resin discharged from the bottom of column 14 may be conveyed to the top of adsorption column 11 via line 4 by an airlift.

While resin is being withdrawn from the bottom of columns 11, 12, 13 and 14, supply of the streams 9, 15, 24 and 23 respectively to the bottom of the columns will be stopped. It will be appreciated that resin may be moved between the columns 11, 12, 13 and 14 simultaneously or at different times.

Pilot Trial

A pilot trial was conducted to verify that the combined use of i) forming agglomerates of suspended particles in the feed water stream by coagulation and flocculation, ii) and passing the feed water stream through a bed of the sorbent particles in order to simultaneously filter the suspended particles and sorb ionic species from the feed stream. The results of the trial provided an insight on whether the concentration of colloidal particles in raw water can greatly reduce in a cost effective manner and enable a product water stream to be subjected to subsequent treatment steps if desired, such as reverse osmosis.

There is need to be able to treat water so as to remove salts, colloidal particles and other particles within the size range of 10 nm to 0.1 mm. An object of the pilot trial was to remove particles in this size range by first agglomerating the particles using coagulation and flocculation techniques to form larger particles. The following is detailed description of the pilot trial conducted.

Test Rig

Figure 2:
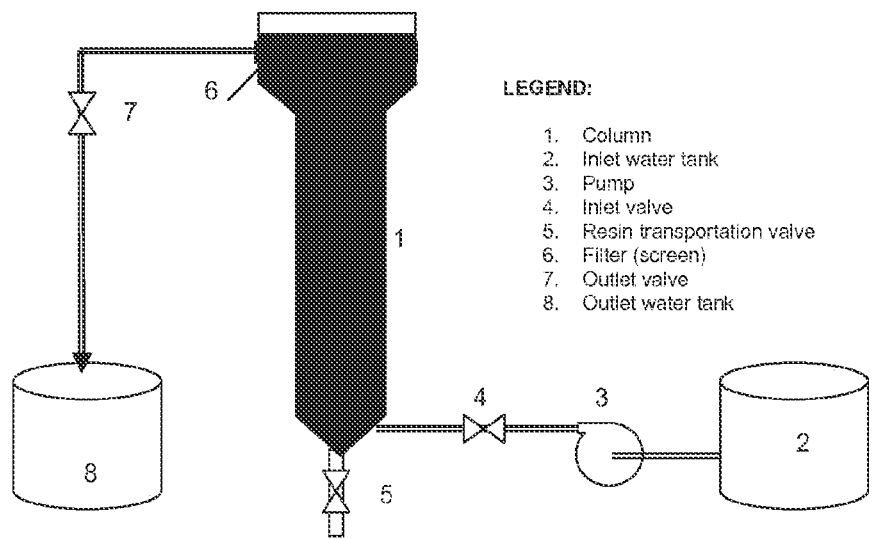
FIG. 2 is a schematic illustration of a test rig used to perform a trial.

FIG. 2 is schematic illustration of a test rig that was used to perform the trial. The test rig included a sorption column having a total volume of 2,700 mL. 2,000 mL of a weak acid cation (WAC) exchange resin was loaded in the column. The test rig also included a filter screen 6 and outlet valve 7, and outlet water tank 8, an inlet water tank 2, and inlet pump 3, and inlet valve 4 and a resin transportation valve 5 for discharging resin from the column 1.

The resin was located between the inlet 4 and outlet 6. An additional volume of the resin was be placed on top of the resin above the outlet 6 so as to tightly pack the working resin in the column 1 down and prevent the resin from being expanded at high liquid superficial velocity.

Methodology

Contaminated pond water was supplied in a 1,000 L IBC as the feed source for the test rig. Coagulant in the form of ferric chloride (calculated as 10 ppm as $Fe^{3+}$) was added to the feed water and mixed at a speed of 100-120 rpm (high speed) using an overhead stirrer. After 3-4 minutes the mixing speed was reduced to 45-55 rpm (low speed) and flocculant in the form of Anionic polymer, Ultrion 7175 (calculated as 0.2 ppm) was added and mixed for a further 15 minutes. Two trials were conducted and the feed water used in both these tests had a turbidity of 9.5 NTU.

The pretreated feed solution (constantly mixed at low speed) was pumped into base of the resin filled column shown in FIG. 2.

Periodically a 200 mL portion of resin was drawn from the base of the column and deposited in a loaded resin container; an equivalent sample of 200 mL of barren resin was added to the top of the column.

Moving the resin this way allows for the ratio of water to resin to be controlled and mimics the counter-current operation of the full scale plant. Changing the resin ratio of the column (i.e. the resin flow rate through the column with respect to the water flow rate will change the amount of filtered particles reaching and removed from the bottom of the resin column.

Two resin ratios, calculated as water flow rate/resin flow rate, were used to examine if the resin ratio would have an influence on the ability of the resin column to filter the water to a satisfactory level.

Table 1 below summarises the resin ratios.

TABLE 1

Resin ratios tested with flow conditions

| | | | | |
|---|---|---|---|---|
| 1:50 | 15 | 0.20 | 40 | 14 |
| 1:75 | 15 | 0.20 | 60 | 14 |

Two test periods, one for each resin ratio was undertaken over 2 days, operating for 7 hours each day.

During the operation, samples were taken periodically throughout the resin transfer cycle time to analyse for NTU. Samples for turbidity measurement were taken:
5 minutes prior to a resin transfer
1 minute after a resin transfer
20 minutes after a resin transfer During the test, the treated water was collected and a composite sample was taken and analysed for Silt Density Index (SDI).

The analysis showed that there as very little difference in the performance of 1:50 and 1:75 ratios. This suggests that the volume of resin being withdrawn from the column was sufficient in both cases to remove all filtered particles accumulated in the bed of the resin. The performance of the resin bed does not seem to be deteriorating over time.

A composite sample of the water for both resin ratios was sent to an external laboratory to analyse for SDI. Table 2 below provides turbidity (NTU) and Silt Density Index (SDI) for the two resin ratios.

TABLE 2

Composite Turbidity and Silt Density Index Results

| | | |
|---|---|---|
| 1:50 | 0.15 | 3.95 |
| 1:75 | 0.15 | 3.91 |

Figures 3A, 3B, 3C:
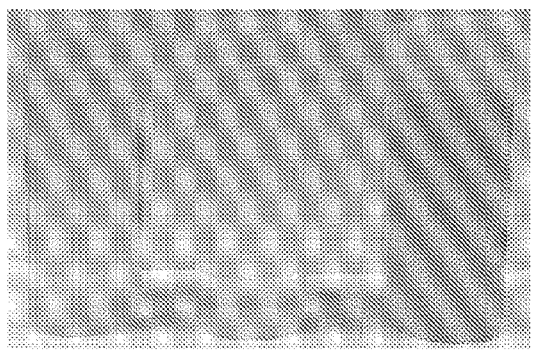
FIG. 3a is a photograph of a sample of the feed water following treatment with a coagulant and a flocculant prior to ionic sorption and particulate filtration in a column shown in FIG. 2.
FIG. 3b is a photograph of a sample of treated water discharged from the top of the column shown in FIG. 2.
FIG. 3c is a photograph of a sample of the solids washed from the resin that is discharged from the bottom of the column shown in FIG. 2.

Resin withdrawn from the column was washed using a fluidised approach to separate and collect the solids. FIGS. 3a to 3c are photographs of the different samples, namely 3a being a sample of the feed water after forming agglomerates using coagulants and flocculants, 3b being the treated water discharged from the top of the column, and 3c being a sample of the solids washed from the resin. As can be seen, the water of FIG. 3a is translucent (or only partially transparent) and the presence of suspended material can be seen from the colouration of the water, whereas the water of FIG. 3b is transparent, representing that the water is relatively lean of suspended particles. In contrast, water shown in FIG. 3c is a sample of the wash solution containing the solids, or ions washed from the resin. As can be seen, the water is clouded with particles and is non-transparent.

Results

The use of coagulation and flocculation prior to the treatment of water using a semi-continuous packed moving ion exchange process at the resin ratios of 1:50 and 1:75 has produced water with a turbidity of 0.15 NTU and a Silt Density Index of 3.9.

This water is suitable for processing by reverse osmosis without further solids filtration. The above treatment removes the need to extensively filter such water using multimedia filters, microfiltration and ultrafiltration or significantly reduces the size of the filtration unit if still required.

Furthermore, the solids trapped by the resin bed are easily separated from the resin beads by fluid washing techniques. The solids can then be thickened using a lamella plate separator or similar device to further increase the water recovery efficiency.

The invention claimed is:

1. A process for removing suspended particles and at least one ionic species from a feed water stream to produce a product water stream, the process includes the steps of:
   a) forming agglomerates of the suspended particles in the feed water stream to form agglomerated particles;
   b) passing the feed water stream containing the agglomerated particles through a bed of particulate sorbent material so as to
      i) sorb the ionic species from the feed water onto the sorbent to provide a loaded sorbent and
      ii) filter the agglomerated particles from the feed water using the bed of particulate sorbent material as a filtration medium to load the bed with the agglomerated particles, and thereby produce the product water stream;
   c) removing the filtered particles and the ionic species from the filtration medium by the following
      washing the filtered particles from the sorbent; and
      desorbing the ionic species from the sorbent using a desorbent solution to provide a regenerated sorbent;
   d) re-using the regenerated sorbent in step b).

2. The process according to claim 1, wherein the step of forming agglomerates includes agglomerating particles of any size less than 0.2 mm in cross section or diameter.

3. The process according to claim 1, wherein the step of forming agglomerates includes treating a feed stream, or at least a portion thereof, with a coagulating agent.

4. The process according to claim 3, wherein the coagulating agents includes any one or a combination of alum, ferric chloride, ferric sulphate, and aluminum chloride.

5. The process according to claim 3, wherein the coagulating agents comprise ferric chloride in an amount from 5 to 20 mg/L to the feed water.

6. The process according to claim 1, wherein the step of forming agglomerates includes treating the feed water, or at least a portion thereof, with a flocculating agent.

7. The process according to claim 6, wherein the flocculating agent is a polyelectrolyte.

8. The process according to claim 1, wherein the adsorbent is an ion exchange resin having a size distribution ranging from 4.0 mm or less.

9. The process according to claim 1, wherein the bed of the particulate sorbent material is a fixed bed.

10. The process according to claim 1, wherein the bed of the particulate sorbent material is a continuously moving bed in a column, or a bed that moves discontinuously in the column, and wherein the sorbent and feed water stream flow in counter current directions in which barren sorbent is added to an upper section of the column and the product water stream is discharged at or near to the upper section of the column.

11. The process according to claim 1, wherein the bed of the particulate sorbent material functions as a particulate filtration medium in which the agglomerated particles are arrested from the feed water in or by voids between the sorbent material.

12. The process according to claim 1, wherein a lower section of the bed loaded with ionic species and loaded with filtered agglomerated particles is discharged from the column on a periodic basis.

13. The process according to claim 12, wherein when the lower section of the bed of sorbent is removed from the column, the feed water stream is stopped from entering the column.

14. The process according to claim 1, wherein the water product stream has the following properties:
   Turbidity <0.5 NTU
   Silt Density Index <4.

15. The process according to claim 1, wherein the amount of ionic species removed from the feed water stream ranges up to 99% by weight.

16. The process according to claim 1, wherein the washing water used to wash the filtered particles from the filtration medium is a substream of the feed water stream that has been split from the feed water stream prior to the step of forming agglomerates in the feed water stream.

17. The process according to claim 16, wherein the sorbent is fluidized in at least one fluidized section of the washing stage in which the sorbent is suspended in a volume of the washing water that ranges from 100 to 200% of the volume of the sorbent when in a solid non-fluidized bed.

18. The process according to claim 1, wherein the desorption solution includes any one of: i) an acid; ii) an alkaline; and iii) a salt.

19. The process according to claim 18, wherein the desorption solution moves in counter-current to the sorbent in a desorption column.

20. The process according to claim 1, wherein the process includes a sorbent rinsing step in which desorbed ionic species and desorption solution being washed or rinsed from the sorbent prior to the sorbent is re-used according to step d).

21. The process according to claim 20, wherein the rinsing step is carried out using a substream of the water product stream.

22. The process according to claim 1, wherein the feed stream containing agglomerated particles formed in step a) is fed directly to the bed of particulate sorbent material without an intervening separating step to remove agglomerated particles.

23. The process according to claim 1, wherein the step of forming agglomerates includes agglomerating particles having a size in the range of 10 nm to 0.1 mm.

24. The process according to claim 1, wherein the amount of ionic species removed from the feed water stream ranges from 95 to 99% by weight.

25. The process according to claim 1, wherein the desorption solution includes any one of: i) an inorganic acid; ii) an inorganic alkaline; and iii) an inorganic salt.

26. The process according to claim 1, wherein the adsorbent is an ion exchange resin having a size distribution ranging from 0.1 mm to 4.0 mm.

* * * * *